Sept. 5, 1961 G. L. HITZ 2,998,646
METHOD OF JOINING METAL BY HIGH PRESSURE
CONTROLLED TEMPERATURE DIFFUSION WELDING
Filed June 18, 1958 2 Sheets-Sheet 1

Gifford L. Hitz
INVENTOR.

Gifford L. Hitz
INVENTOR.

United States Patent Office 2,998,646
Patented Sept. 5, 1961

2,998,646
METHOD OF JOINING METAL BY HIGH PRESSURE CONTROLLED TEMPERATURE DIFFUSION WELDING
Gifford L. Hitz, 1661 Bel Air Road, Los Angeles, Calif.
Filed June 18, 1958, Ser. No. 742,964
1 Claim. (Cl. 29—470)

My invention relates to metal joining or welding, particularly for joining pipes or cylinders.

The object of my invention is to provide a method for producing welded joints of high strength, by a combination of heat, pressure and metal displacement in such controlled proportions and conditions that the actions of diffusion, recrystallization and recovery of the metal grain structure create an homogeneous and complete bond across the interface of the joint.

A further object of my invention is to achieve such a weld using temperatures low enough to allow retention by the steel of high strengths attained by previous treatment, such as by heating, quenching and tempering, or by cold or warm working.

A further object of my invention is to provide high strength welds of smooth surface, thus avoiding secondary operations of grinding, machining or planishing.

These objects I attain by cold rolling tapered mating threads on the pieces to be welded, wringing the two pieces together in tight threaded contact, then inserting a chilled plug inside the joint, and confining the outside of the joint by placing a warmed ring around the outside. Then by applying heat to the plug, thus expanding it, and, as the metal area of the joint is warmed to the calculated temperature, then chilling and shrinking the external ring, thus placing the weld joint area under a combination of forces resulting in extremely high pressure, causing some displacement of metal. The combination of metal displacement, prior cold work, and controlled temperature, together with the extremely high pressure being applied at the joint, cause recrystallization and recovery of the grain structure, and particle diffusion at and across the threaded interface. Care in preparation of the bevelled face prior to rolling threads thereon, to prevent contamination, is accomplished by conducting the operation inside a plastic bag from which the atmosphere has been purged and an inert or reducing gas substituted therefor.

It is well known that metals which have been heated to normal forging temperature can be joined together under pressure, the process being known as forge welding. Disadvantages of joining metals by forge welding are an inability to control metal displacement where the two soft hot faces are meshed together, contamination and deterioration of the faces to be joined due to the extreme heat (causing decarburization and formation of oxides), and alteration of the original grain structure (particularly disadvantageous where improved physical characteristics had previously been attained by heat treatment or cold working).

The method of my invention uses temperatures sufficiently high to cause increased thermal activity at an atomic and lattice level, but sufficiently low to enable the metal to retain adequate stiffness so that metal displacement can be directed and controlled, and low enough to permit retention of strength gained from prior heat treatment or cold working, and low enough to avoid oxidation or decarburization.

Another commonly used method of welding uses the heat created by the resistance of an electric current across the joint interface. This method, however, creates extremely high local temperatures, which result in a non-uniform metallurgical condition of reduced strength. This method referred to a resistance welding or "flash" welding, is difficult to apply to heavy sections or large areas.

It is a feature of my invention that it can be applied to heavy sections and large diameters, such as are required in fabricating sections of pressure vessels, heater coils, or pipe lines.

One mode of applying the principles of my invention is shown in the accompanying drawings, but it is intended that other means of preparing and coldworking the interfaces to be welded, and of applying high pressures and moderate heat can be used to carry out the method of my invention.

The accompanying drawings illustrate an arrangement for accomplishing the above stated principles.

FIGURE 10 shows a conventional hollow spindle engine lathe of standard design, to which have been added several appurtenances of novel design. These added appurtenances include the following items. A nonrotating chuck 35 attached to the headstock 12 so as to permit the pipe 1 to be held stationary whilst being worked on. A pair of hydraulic cylinders 26 and 27 and a crosshead assembly 25 arranged to provide reciprocal motion through rod 24 to the internal expanding plug 23. The tailstock 13 carries a stationary chuck (which does not rotate) 36, for gripping pipe 2. The tailstock supports a pair of hydraulic cylinders 29 and 30, to which is attached external ring 28. The conventional cross-slide 14 carries two rotatable heads 17 and 20 mounted in a carrier 16. All other features and controls of a standard hollow spindle engine lathe are retained, although not illustrated here in detail. A plastic bag or envelope 40 is shown placed around the lathe assembly and fastened to non-rotating chucks 35 and 36, with apertures in the bag at these two points to permit the entry and withdrawal of the workpieces, plugs 38 and 39 being inserted in the pipes to complete the sealing.

In order to weld together two pieces of pipe with the apparatus, a length of pipe 1, one end of which has been previously bevelled by usual methods of machining, is inserted into the apparatus through the hollow headstock 12, and is gripped by stationary chuck 35. Plug 23 on rod 24 together with seal 39 are inserted into pipe 1. Crosshead 25, which is hinged to cylinder 27 by pin 43 is swung into position shown in FIGURE 10 and fastened to cylinder 26 with pin 41. Plug 23 is fastened to crosshead with pin 42, and heating element wire 34 is connected, as is also cooling duct pipe 33.

Next, another length of pipe 2, one end of which has been previously bevelled by usual methods of machining, is inserted through hollow tailstock 13 and gripped by non-rotating chuck 36; the bevelled end of pipe 2 is positioned inside of ring 28 with wire and pipe already connected to heating element 32 and coolant duct 31 respectively. Plug seal 38 is inserted in pipe 2 to complete the sealing. Atmosphere contained in surrounding bag 40 is next purged by introducing inert or reducing gas into the bag, using known methods.

A fresh and uncontaminated metal surface is next prepared on the previously bevelled end of pipe 2 by positioning rotatable shaving head 17 along the center line of the lathe.

Cross-slide 14 is next advanced toward headstock 12 until driving dog 15 engages slot 44 in the shaving head. The main rotational drive of the lathe is next started, rotating pin 15 and head 17. Tailstock assembly 13 is moved toward the headstock until cutter 19 removes a few thousandths of an inch of metal from the bevel on pipe 2.

A fresh and uncontaminated metal surface is next prepared on pipe 1 by moving cross-slide 14 toward headstock 12 until cutter 18 removes a few thousandths of an inch of metal from the bevel on pipe 1.

The shaving operation having been completed, tailstock 13 and cross-slide 14 are retracted to positions shown in FIG. 10. The main rotational drive of the lathe is stopped. Carrier 16 is now moved on cross-slide 14 until rotatable head 20 is on the center line of the lathe. Mating threads are next rolled on the freshly prepared bevelled surfaces of pipe 1 and 2, motion of the various parts being similar to those carried out for the shaving operation.

The thread rolling operation having been completed, tailstock 13 and cross-slide 14 are retracted to positions shown in FIGURE 10 and carrier 16 is moved on cross-slide 14 so that the center line of the lathe is left clear and unobstructed. The main rotation of the lathe is stopped and pipe 1 is gripped with rotatable chuck 37, the grip of stationary chuck 35 being next released. The main rotation of the lathe is started, and tailstock assembly 13 is advanced toward the headstock until the female threads on pipe 2 engage the male threads on pipe 1, continuing rotation until the threads are completely engaged. A slippable belt or clutch on the lathe drive will prevent damage to the threads from overrunning.

Next, plug 23, which has been chilled by circulating cold fluid through cooling pipe 33 and ducts within plug 23, is pushed into position by hydraulic cylinders 26 and 27 so that the threaded joints of pipes 1 and 2 is centered on the plug.

Next, ring 28 which has been previously warmed by electric heating element 32, is advanced by the action of hydraulic cylinders 29 and 30, so that the threaded joint of the pipes is centered in the ring.

Next heat is applied to plug 23 by means of electric resistance heating element 34 within plug 23, causing plug to expand against pipes 1 and 2, until temperature of the metal of the pipes is raised to the correct temperature, which will vary according to the metal composition, the exact amount of pressure, and the amount of cold working done on the threads, but which in any event for carbon steel will not exceed 1300° F.

Next, ring 28 is chilled by circulating cold fluid through coolant duct 31, causing ring to shrink, thus creating extreme pressure against warmed pipes 1 and 2, and causing slight metal displacement. The combination of heat, and pressure having now completed the welding action, which as described above is caused by recrystallization and recovery of the grain structure and atomic motion by diffusion across and between the threaded interfaces, it remains now only to remove the plug, which can best be done by chilling it sufficiently to cause it to shrink, then reversing the previous action of hydraulic cylinders 26 and 27, thus withdrawing the plug from the joint. Likewise, ring 28 is warmed to cause it to expand, and the welded lengths of pipe are removed from the apparatus in the direction shown by arrow 41.

FIGURE 1 shows pipes 1 and 2 after freshly prepared and uncontaminated surfaces 3 and 4 have been developed by cutters 18 and 19 of FIGURE 10.

Figure 1:
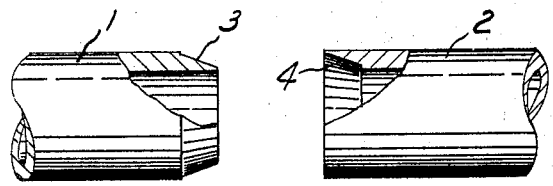
Figure 2:
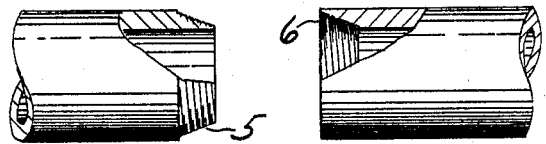
FIGURE 2 shows the same surfaces after the threads have been rolled on them by thread rolls 21 and 22 of FIGURE 10.
Figure 3:
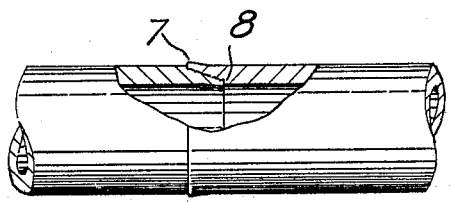
FIGURE 3 shows the pipes after being wrung or threaded together, and showing slight deformation at 7 and 8 due to the shape of the threads as formed by the thread rolls.
Figure 4:
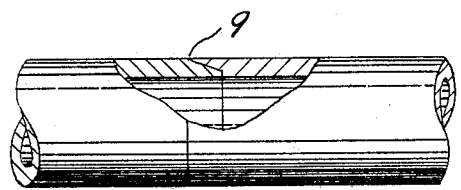
FIGURE 4 shows the two pieces of pipe after having been welded together by the process as described above, and showing that the deformation shown at 7 and 8 in FIGURE 3 has been displaced and smoothed out, leaving a smooth surface inside and outside, at point 9 of the weld.
Figure 5:
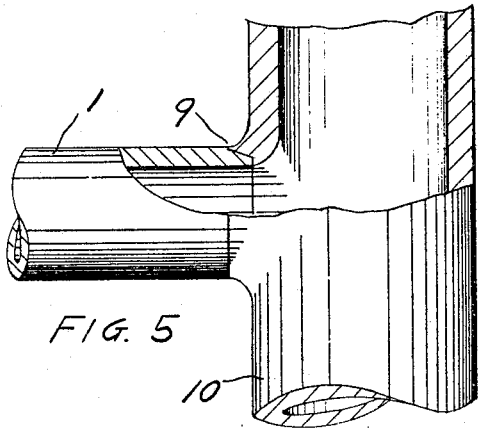
FIGURE 5 shows a finished weld as applied to a branch connection between a pipe and a header 10.
Figure 6:
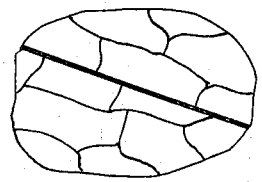

FIGURE 6 portrays the grain structure of a piece of carbon steel at a typical point along the threaded interface of the joint between points 7 and 8 of FIGURE 3, magnified about one thousand times.

Figure 7:
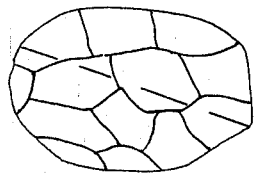

FIGURE 7 shows the same point after the application of heat and pressure as described above, and shows the recrystallization and recovery of the grain structure across the interface, and showing that an homogeneous structure has resulted.

Figure 8:
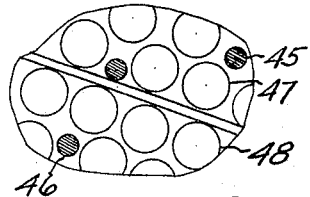

FIGURE 8 shows a diagram of the atomic structure at the same point shown in FIGURE 6, and indicating relative positions of carbon atoms 45 and 46, and iron atoms 47 and 48.

Figure 9:
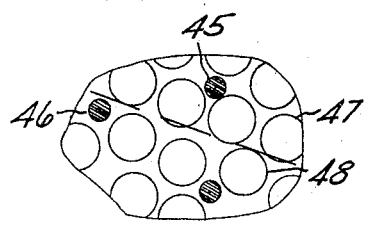
Figure 10:
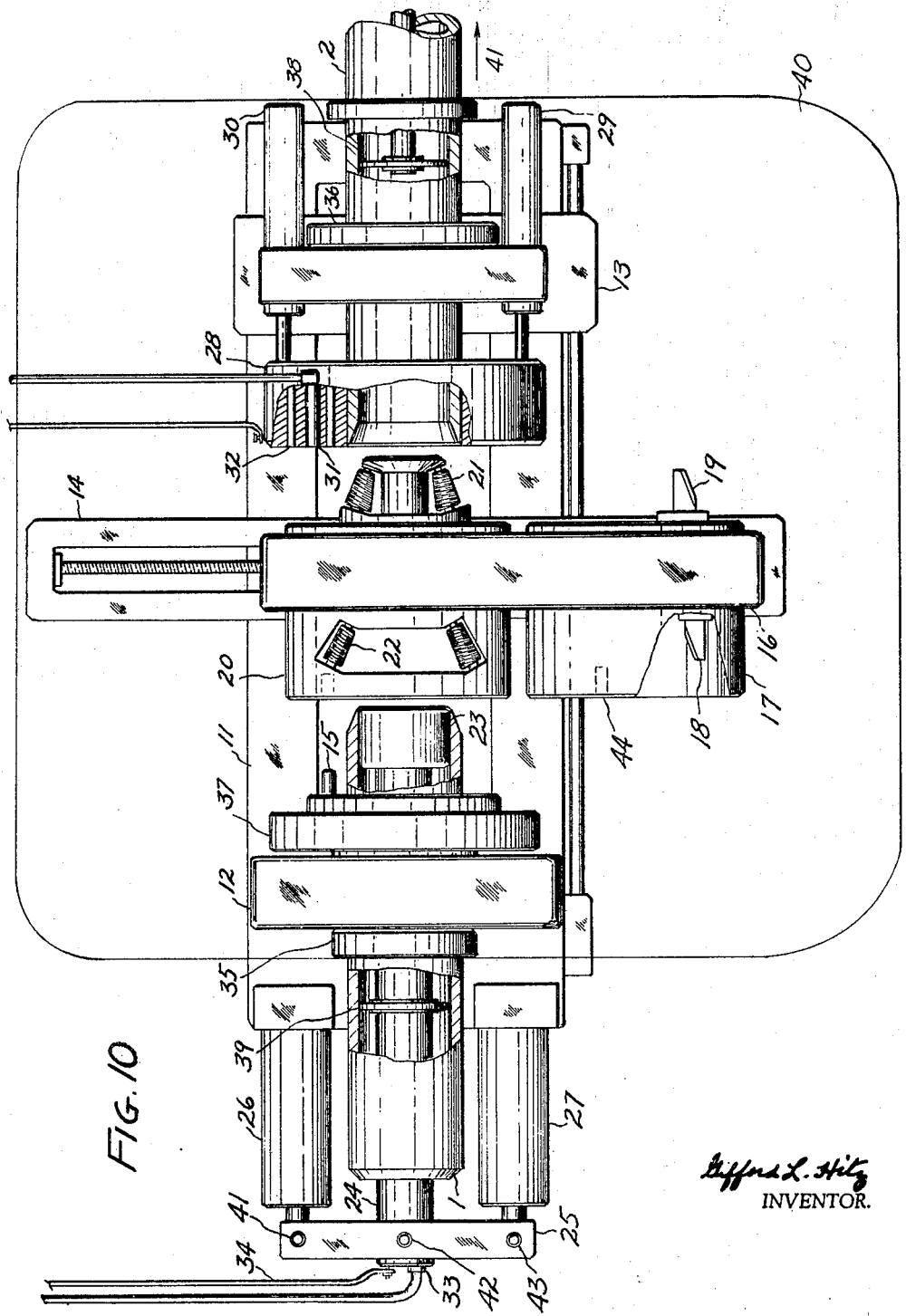

FIGURE 9 shows a diagram of the atomic structure at the same point shown in FIGURE 8, after the welding process of my invention has been completed, and shows that the carbon atoms 45 and 46 have derived sufficient additional energy from the heat and pressure and cold work applied by the process to have moved by diffusion and have caused a displacement and rearrangement of iron atoms 47 and 48, thus creating a new and homogeneous structure across the interface of the joint.

It should be understood that either a longitudinal or girth weld in tubular members can be made by this process, and that the process can also be applied to joining and welding flat or angular pieces.

What I claim for my invention is—

The method of joining and welding tubular sections of metal, particularly carbon steel, which can be cold worked and recrystallized by heating, while maintaining substantially uniform metal thickness, and attaining full bonding strength and smooth surfaces in the areas surrounding and at the joint, by preparing freshly bared tapered or bevelled faces at the areas to be joined, cold working these faces by rolling threads thereon, wringing the two faces together into tight threaded contact, placing a member against the inside surfaces of the members being joined, at the joint, placing a restraining member around the outside surfaces of the members being joined, at the joint, applying heat to the inside tooling member causing thermal expansion and pressure against the inside surfaces of the members being joined and raising the temperature of the metal of the members being joined, at the joint, causing increased thermal activity therein, particularly at the areas of high residual stresses caused by the cold working previously done, and thus causing recrystallization, crystal recovery and atomic diffusion across the interface of the joint between the members being joined at a temperature substantially lower than would have been required if the faces had not been previously prepared by cold working, the recrystallization, crystal recovery and atomic diffusion cooperating to create an homogeneous grain structure and full strength bond across the interface, chilling the outside restraining member to cause thermal shrinkage and increased pressure against the outside surfaces of the members being joined sufficient to create controlled metal displacement in the joint area, resulting in smooth outside surfaces, and improving and stabilizing the bonding action at the interface of the joint, the entire process being accomplished in an inert or reducing gas to avoid contamination, decarburization or oxidation of the interface of the joint.

References Cited in the file of this patent

UNITED STATES PATENTS

| | | |
|---|---|---|
| 376,750 | Murphy | Jan. 24, 1888 |
| 797,844 | Doolittle | Aug. 22, 1905 |
| 1,162,772 | Henderson | Dec. 7, 1915 |
| 1,220,772 | Murray | Mar. 27, 1917 |
| 2,040,240 | Coberly et al. | May 12, 1936 |
| 2,102,259 | Edwards et al. | Dec. 14, 1937 |
| 2,192,904 | Ferris | Mar. 12, 1940 |
| 2,691,815 | Boessenkool et al. | Oct. 19, 1954 |
| 2,746,141 | Hobrock | May 22, 1956 |
| 2,820,286 | Andrus | Jan. 21, 1958 |

FOREIGN PATENTS

| | | |
|---|---|---|
| 609,035 | Great Britain | Sept. 24, 1948 |

OTHER REFERENCES

Ser. No. 292,740, Bernstorff et al. (A.P.C.), published July 13, 1943.